March 10, 1931.  W. P. RICHARDSON  1,796,162
AEROPLANE LANDING WING
Filed Dec. 13, 1929  2 Sheets-Sheet 1

Walter P. Richardson,
INVENTOR
BY Victor J. Evans
ATTORNEY

March 10, 1931.  W. P. RICHARDSON  1,796,162
AEROPLANE LANDING WING
Filed Dec. 13, 1929    2 Sheets-Sheet 2

Walter P. Richardson
INVENTOR
BY Victor J. Evans
ATTORNEY

Patented Mar. 10, 1931

1,796,162

UNITED STATES PATENT OFFICE

WALTER P. RICHARDSON, OF TAMPA, FLORIDA

AEROPLANE LANDING WING

Application filed December 13, 1929. Serial No. 413,885.

This invention relates to landing means for aeroplanes, the general object of the invention being to provide oscillatory wings for the plane operated by motors for permitting the plane to land in a small landing field or the like and to prevent the plane going into a tail spin or nose dive.

This invention also consists in certain other features of construction and in the combination and arrangement of the several parts, to be hereinafter fully described, illustrated in the accompanying drawings and specifically pointed out in the appended claims.

In describing the invention in detail, reference will be had to the accompanying drawings wherein like characters denote like or corresponding parts throughout the several views, and in which:—

Figure 1:
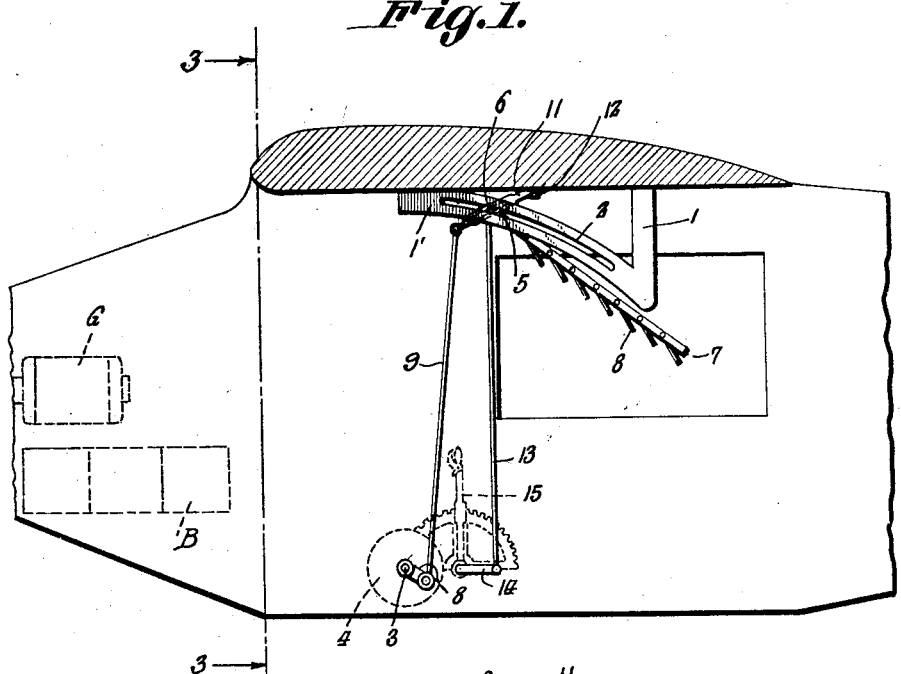
Figure 1 is a fragmentary elevation, showing an aeroplane provided with the invention.

In these views, the numeral 1 indicates a depending member arranged on each side of the fuselage of the plane and suitably attached to the wing or other part of the plane, this member including an arc-shaped part 1' which is formed with a slot 2. This slot is made on an arc having the shaft 3 of a motor 4 as its center. A block 5 is slidably arranged in each slot and forms a bearing for a shaft 6 to which the oscillatory wing 7 is connected. Each wing consists of a series of flaps 8 which are so arranged that they will overlap when the wing is moving downwardly and thus stop the passage of air through the wing, but will open when the wing is moving upwardly so that the air can pass through the wing and thus offer no resistance to the upward movement of the wing.

Figure 2:
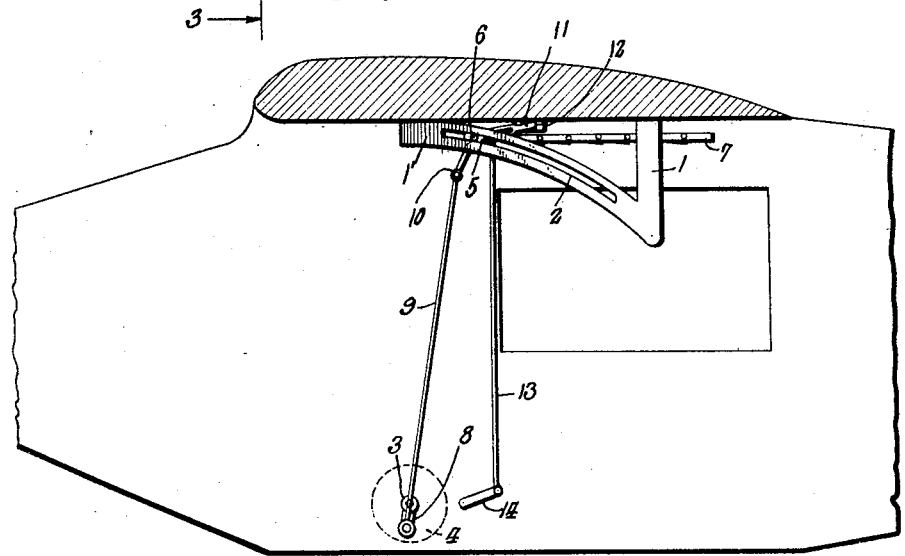
Figure 2 is a similar view but showing the wing in inoperative position.
Figure 3:
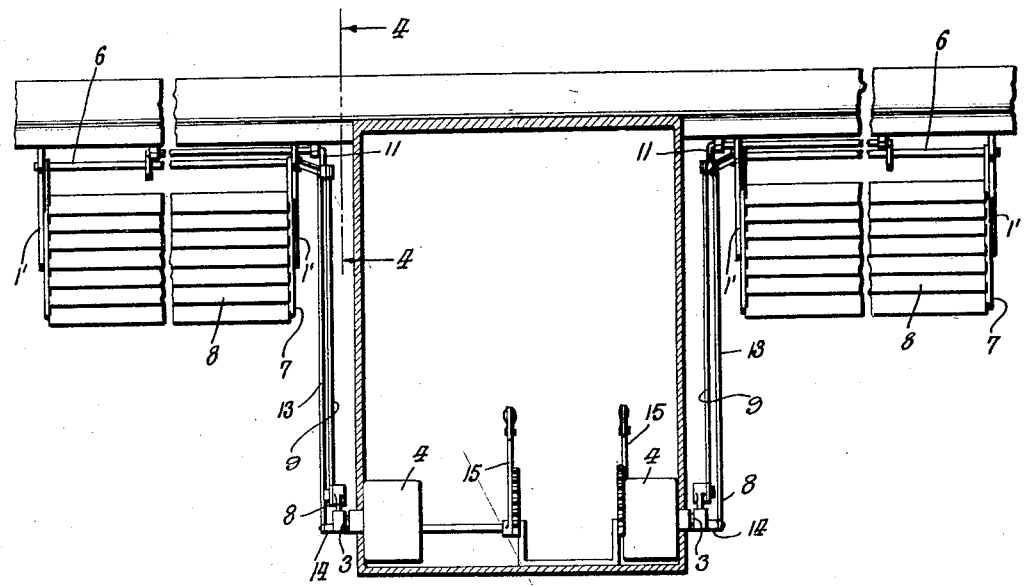
Figure 3 is a section on line 3—3 of Figure 1.
Figures 4, 5:
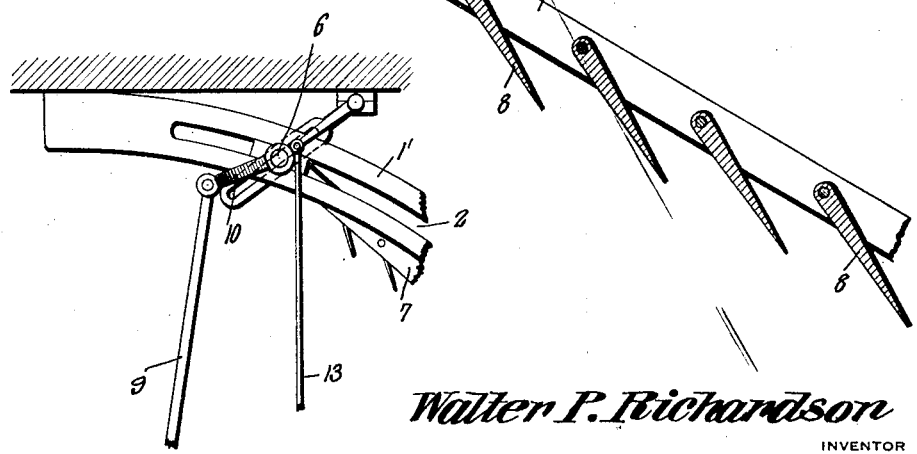
Figure 4 is a section on line 4—4 of Figure 3.
Figure 5 is a fragmentary sectional view through one of the wings.

The shaft of each motor 4 has a crank arm 8 thereon which is connected by a rod 9 with a crank 10 on the shaft 6 so that when the motor is in operation, the wing will be oscillated. The block is adjusted in the slot through means of a slotted arm 11 pivoted to the main wing, as shown at 12, with the shaft 6 passing through the slot. A rod 13 is connected with each arm 11 and has its lower end connected with a crank 14 which in turn is connected with a hand lever 15 so that by manipulating each hand lever, each block is adjusted in each slot. These parts are so arranged that the wings can be swung upwardly against the main wing, as shown in Figure 2, so that they will be out of the way and not interfere with the passage of the plane through the air. When the plane is to make a landing or the pilot wishes to get the plane out of a nose dive or tail spin, he would first manipulate one or both levers to lower the oscillating wings and then start up the motors, either one or both, so that the motors will cause the wings to oscillate and as before stated, as the wings move downwardly, the flaps will close so that the wings will beat the air and give the plane a lifting action so that the plane can land on a small field or when used as a stabilizing means, the beating wings will act to cause the plane to get out of a tail spin or nose dive. As the wings move upwardly, the flaps will open so that the wings will offer no resistance to the air.

I provide batteries B for furnishing current to the motors and a generator G for supplying current to the batteries, though the motor can be supplied with current in any other suitable manner.

It is thought from the foregoing description that the advantages and novel features of the invention will be readily apparent.

It is to be understood that changes may be made in the construction and in the combination and arrangement of the several parts, provided that such changes fall within the scope of the appended claims.

What I claim is:—

1. In an aeroplane, a pair of wings arranged under the main wing, one on each side of the fuselage, a supporting member for each wing including an arc-shaped part having a slot therein, a block sliding in each slot, a shaft carried by the block and to which the wing is connected, a crank on the shaft, a motor for each wing, a crank on the motor shaft, a rod connecting said crank with the first mentioned crank whereby the wing is oscillated by its motor, said arc-shaped member being radial to the motor shaft, manually operated means for adjusting each block in its slot, each wing including flaps closing on the downward movement of the wing, and opening on the upward movement thereof.

2. In an aeroplane, a pair of wings arranged under the main wing, one on each side of the fuselage, a supporting member for each wing including an arc-shaped part having a slot therein, a block sliding in each slot, a shaft carried by the block and to which the wing is connected, a crank on the shaft, a motor for each wing, a crank on the motor shaft, a rod connecting said crank with the first mentioned crank whereby the wing is oscillated by its motor, said arc-shaped member being radial to the motor shaft, manually operated means for adjusting each block in its slot, such means consisting of a slotted arm pivoted to a part of the plane and having its slot receiving a part of the wing shaft, a hand lever, a crank connected therewith, a rod connecting the crank with each arm, each wing including flaps closing on the downward movement of the wing and opening on the upward movement thereof.

In testimony whereof I affix my signature.

WALTER P. RICHARDSON.